(12) United States Patent
Juettner et al.

(10) Patent No.: US 9,051,952 B2
(45) Date of Patent: Jun. 9, 2015

(54) SUPPORT STRUCTURE COMPONENT OF A MOTOR VEHICLE BODY WITH A PLASTIC INSERT

(71) Applicant: GM GLOBAL TECHNOLOGY OPERATIONS LLC, Detroit, MI (US)

(72) Inventors: Marc Juettner, Nackenheim (DE); Jens Hartmann, Floersheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/938,710

(22) Filed: Jul. 10, 2013

(65) Prior Publication Data

US 2014/0015238 A1    Jan. 16, 2014

(30) Foreign Application Priority Data

Jul. 11, 2012 (DE) .................. 10 2012 013 786

(51) Int. Cl.
| | |
|---|---|
| F16B 17/00 | (2006.01) |
| B60K 15/03 | (2006.01) |
| B60R 5/00 | (2006.01) |
| B60R 11/00 | (2006.01) |
| B62D 25/08 | (2006.01) |
| B60K 1/04 | (2006.01) |
| B60K 15/067 | (2006.01) |
| B62D 21/00 | (2006.01) |
| F16B 11/00 | (2006.01) |
| B60K 15/063 | (2006.01) |

(52) U.S. Cl.
CPC .............. *F16B 17/00* (2013.01); *Y10T 403/70* (2015.01); *Y10T 403/74* (2015.01); *Y10T 403/477* (2015.01); *B62D 21/00* (2013.01); *B60K 15/03* (2013.01); *B60R 5/00* (2013.01); *B60R 11/00* (2013.01); *B62D 25/08* (2013.01); *F16B 11/006* (2013.01); *B60K 1/04* (2013.01); *B60K 15/067* (2013.01); *B60K 2001/0438* (2013.01); *B60K 2015/0634* (2013.01); *B60Y 2304/078* (2013.01)

(58) Field of Classification Search
CPC .......... B62D 21/12; B62D 21/00; B60K 1/04; B60K 2001/0438; B60K 2001/0455; B60K 2001/0461
USPC .................... 180/299, 65.1, 68.5, 69.24, 69.1
See application file for complete search history.

(56) References Cited

U.S. PATENT DOCUMENTS

| | | | | |
|---|---|---|---|---|
| 5,555,950 A | * | 9/1996 | Harada et al. ................. | 180/65.1 |
| 6,418,962 B1 | * | 7/2002 | Wozniak et al. ............... | 137/266 |
| 6,615,656 B1 | * | 9/2003 | Breed et al. ................... | 73/290 R |
| 6,631,775 B1 | * | 10/2003 | Chaney ........................ | 180/68.5 |
| 7,201,384 B2 | * | 4/2007 | Chaney ........................ | 180/68.5 |
| 7,354,102 B2 | * | 4/2008 | Cave et al. .................... | 296/209 |

(Continued)

FOREIGN PATENT DOCUMENTS

| | | |
|---|---|---|
| DE | 2930850 A1 | 2/1981 |
| DE | 10145357 C1 | 5/2003 |
| DE | 10251762 A1 | 5/2004 |

*Primary Examiner* — Faye M Fleming
(74) *Attorney, Agent, or Firm* — Ingrassia Fisher & Lorenz PC

(57) ABSTRACT

A support structure component is provided for a motor vehicle body and to a correspondingly configured motor vehicle body. The support structure component includes, but is not limited to a support element and a plastic fastening structure arranged thereon, which includes, but is not limited to a fastening element for fastening a motor vehicle component.

18 Claims, 3 Drawing Sheets

(56) References Cited

U.S. PATENT DOCUMENTS

| | | | |
|---|---|---|---|
| 7,581,749 B2* | 9/2009 | Robins | 280/728.2 |
| 8,210,301 B2* | 7/2012 | Hashimoto et al. | 180/68.5 |
| 8,317,227 B2 | 11/2012 | Klimek et al. | |
| 8,511,413 B2* | 8/2013 | Ojima et al. | 180/68.5 |
| 2009/0085329 A1* | 4/2009 | Kwak et al. | 280/728.2 |
| 2011/0143179 A1* | 6/2011 | Nakamori | 429/99 |
| 2013/0192914 A1* | 8/2013 | Nakamori | 180/68.5 |

* cited by examiner

A-A

A-A

SUPPORT STRUCTURE COMPONENT OF A MOTOR VEHICLE BODY WITH A PLASTIC INSERT

CROSS-REFERENCE TO RELATED APPLICATION

This application claims priority to German Patent Application No. 10 2012 013 786.9, filed Jul. 11, 2012, which is incorporated herein by reference in its entirety.

TECHNICAL FIELD

The technical field relates to a support structure component of a motor vehicle body, which can be configured with a plastic insert for the fastening of different motor vehicle components.

BACKGROUND

A steadily rising diversification in motor vehicle construction requires a great variety of installation space and connection concepts for accommodating and fastening different motor vehicle components matched to the respective vehicle configuration. Even the great variety of different drives and drive concepts alone requires accommodating correspondingly different energy storage devices, such as for example batteries, accumulators and/or fuel tanks.

A motor vehicle driven by an internal combustion engine for example requires an at least slightly different division of installation space with respect to its fuel tank than a hybrid vehicle or than a purely electromotorically operated motor vehicle. In particular gas-operated motor vehicles, which can for example be operated with liquefied gas or with a gas under high pressure, each have to have separate installation space and fastening concepts for gas tanks to be carried along. In addition, various load carrier systems are known in particular for the tail region of motor vehicles, which comprise for example a load carrier that can be pulled out in vehicle longitudinal direction, for example for carrying along bicycles or comparable pull-out stowage space containers.

Almost any of the previously mentioned motor vehicle configurations requires a configuration-specific connection of individual motor vehicle components to the vehicle body. In this connection, a body for a motor vehicle is known for example from DE 10 2009 056 851 A1, which comprises a structural unit including a rear-frame structure with a rear axle and brackets for a fuel tank or an electrical storage unit. The structural unit in this case is fastened to a floor plate of the body. By doing so, the motor vehicle can be optionally equipped through a suitably configured rear-frame structure for drives with an internal combustion engine or purely electric drives or a hybrid drive.

In view of the foregoing, at least one object is to provide a support structure component that can be universally adapted to different motor vehicle configurations and a correspondingly configured motor vehicle body, which with respect to its metal components can be configured preferably unchanged for all motor vehicle configurations and variants, yet provides different connection possibilities corresponding to the respective vehicle configuration for a motor vehicle component to be fastened to the support structure component. In addition, other objects, desirable features and characteristics will become apparent from the subsequent summary and detailed description, and the appended claims, taken in conjunction with the accompanying drawings and this background.

SUMMARY

A support structure component is provided for a motor vehicle body is provided, which comprises a support element and at least one plastic fastening structure that can be arranged thereon. The support element in this case is preferably formed as a metal component, in particular as a profiled sheet metal and acts as a load-bearing component of the motor vehicle body. The plastic fastening structure in this case comprises at least one fastening element, which serves for fastening at least one motor vehicle component to the support structure component.

The support structure component is configured to connect different motor vehicle components, for example batteries, liquefied gas or pressure gas tanks but also for connecting for example a pull-out load carrier module. The support element of the support structure component is substantially unchanged and can be connected in the conventional manner as part of the body-in-white construction with further load-bearing components of the motor vehicle body, in particular welded.

A motor vehicle component-specific adaptation of the support structure component in this case can be exclusively effected by way of the plastic fastening structure, which can be adapted in a particularly simple manner to the respective motor vehicle component to be fastened to the support structure component and its fastening device. Thus, a liquefied gas tank can require an entirely different fastening concept than for example a pull-out load carrier. Depending on whether the motor vehicle is to be equipped with such a tank or with a load carrier, a correspondingly suitable plastic fastening structure can be selected and connected to the support element that is to be anchored in the motor vehicle body in a fixed manner.

Here it is provided that fastening the motor vehicle component, for example the liquefied gas tank, the pressure gas tank, the pull-out load carrier and/or attachment parts of this type is exclusively effected by way of the at least one fastening element provided in the plastic fastening structure. A fastening that is individualized with respect to the respective motor vehicle component can be affected in a particularly simple manner by selecting a suitably configured plastic fastening structure. This has the advantage that motor vehicle configuration-specific connections for individual motor vehicle components can be realized solely through a respectively suitable plastic fastening structure. In this regard, the metal structure of the motor vehicle body can always be formed identically entirely independently of the specific motor vehicle configuration provided.

Accordingly, in the production process of the motor vehicle it is merely required to select a plastic fastening structure which is adapted or matched to the respective motor vehicle component and to fasten this to the support element of sheet metal in a suitable manner. According to an embodiment, the plastic fastening structure comprises at least in portions a contact surface which corresponds to the contour of the support element and brought into contact with said support element. Here it is provided in particular that the plastic fastening structure can be connected to the support element of the support structure components over as large an area as possible, preferably over its entire extension. In this manner, mechanical concentrated loads can be largely reduced, which can have an advantageous effect on the lifespan and durability of the plastic fastening structure.

In addition, any forces introduced into the plastic fastening structure by way of the fastening element can be comparatively homogeneously discharged or transferred into the support element by way of a preferably full area connection of the plastic fastening structure to the support element. According to a further configuration, it is provided in particular in this case that the support element, which is preferably formed as a sheet metal or at least comprises one or a plurality of sheet metals, has a profiled structure which can for example be designed U-profile-like or L-profile-like. In particular, with a U-profile-like or V-profile-like configuration of the support element, the plastic fastening structure can comprise an insert that can be inserted in the support element or at least form such an insert. Here, the outer contour and shaping of the plastic fastening structure is adapted to the internal geometry of a mounting formed on the support element. The outer and inner geometries of the fastening structure and support element corresponding to one another make possible a particularly simple and accurately fitting mutual arrangement and fastening in the bodywork construction process.

According to a further embodiment, the plastic fastening structure can be connected to the support element in a materially joined manner. Here it is provided in particular to connect the plastic fastening structure and the support element in a non-detachable manner. A materially-joined connection can in particular be effected with one or a plurality of adhesives as well as through a thermal treatment, for example by means of welding, so for example through melting the plastic fastening structure in regions.

In an embodiment, the plastic fastening structure and the support elements can be interconnected with a thermally activatable adhesive. Here it can be provided in particular that the plastic fastening structure is coated with a thermally activatable adhesive on its contact surface facing the support element. Additionally or alternatively, the contour of the support element facing the fastening structure can also be provided or coated with a suitably thermally activatable adhesive or an adhesive component. Here it is conceivable, in particular that the thermally activatable adhesive is a thermally activatable foam, which under the influence of thermal energy can substantially fill out a clearance which remains between support element and plastic fastening structure and thus offset or bridge any installation tolerances and clearances.

According to an embodiment, the plastic fastening structure can be fastened to the support element with fixing elements forming a positive connection at least in a preassembly position. The fixing elements can for example be fastening clips, engagement lugs or similar fastening elements forming a positively joined connection. The fixing elements in this case can be provided on the plastic fastening structure and/or on the support element.

It is conceivable, in particular, that for example on the support element in predetermined positions individual protrusions or through-openings are formed, which can be brought into engagement with movably mounted or deformable fixing elements of the plastic fastening structure. With the fixing elements, the plastic fastening structure can also be positioned on the support element even before being subjected to the effect of thermal energy at least in a preassembly position. When using thermally activatable adhesives or foams, a positively joined connection of the plastic fastening structure on the support element can be effected in particular in a drying process following a painting process of the body-in-white, during which the body-in-white is exposed to appropriate thermal conditions.

According to an embodiment, the support element a cross member that can be arranged in the region of a vehicle rear axle. In its installation position on the motor vehicle, the cross member preferably extends substantially in vehicle transverse direction (y). With its longitudinal ends, it is preferably structurally connected to side members of a rear frame structure of the body extending in vehicle longitudinal direction (x).

In this regard, the plastic fastening structure adapted to the respective motor vehicle configuration makes possible a variable accommodation of further motor vehicle components, for example fuel tanks or load carriers in the tail region of the motor vehicle. According to an embodiment, two plastic fastening structures that with respect to their connection to the support element are substantially formed identically are provided for the support structure component, which comprise differently configured, differently positioned and/or differently oriented fastening elements. With respect to their type, position and/or orientation, the fastening elements are adapted or matched to the corresponding and predetermined counter-fastening elements of the respective motor vehicle component. By selecting a plastic fastening structure that is suitable for the respective motor vehicle component a fastening structure that is matched to and adapted to predetermined installation structures of a motor vehicle component can be provided on the part of the body.

According to a further embodiment, a fastening arrangement for fastening different motor vehicle components to a previously described support structure component is additionally provided. Here, at least one plastic fastening structure each with at least one fastening element is provided for different motor vehicle components, which can be arranged on the support element. The plastic fastening structures in this case differ in particular with respect to the embodiment of their fastening elements for the connection of the motor vehicle components.

Thus, a motor vehicle component, such as liquefied gas tank, can for example require different types as well as differently positioned fastening elements than is the case for a motor vehicle component designed as load carrier. In this regard, the fastening arrangement can comprise a set or a kit including a support element and a multiplicity of vehicle-specifically individualized plastic fastening structures, of which at least one can be selected according to the provided motor vehicle configuration and connected to the support element. Thus, the respective plastic fastening structure comprises at least one fastening element, which with respect to its position, configuration and/or orientation is matched to the motor vehicle component to be fastened to the support structure component.

According to a further embodiment, a motor vehicle body is finally provided, which comprises at least one previously described support structure component or a previously described fastening arrangement. Furthermore, a further motor vehicle component can be arranged on the body which, depending on drive concept and motor vehicle configuration, can be designed for example as a load carrier, in particular as a pull-out load carrier or as a pull-out load box, furthermore as an electric energy storage device or as a fuel tank, for liquid or gaseous fuels.

Accordingly, a motor vehicle is finally provided that comprises at least one previously described support structure component or a corresponding fastening arrangement.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
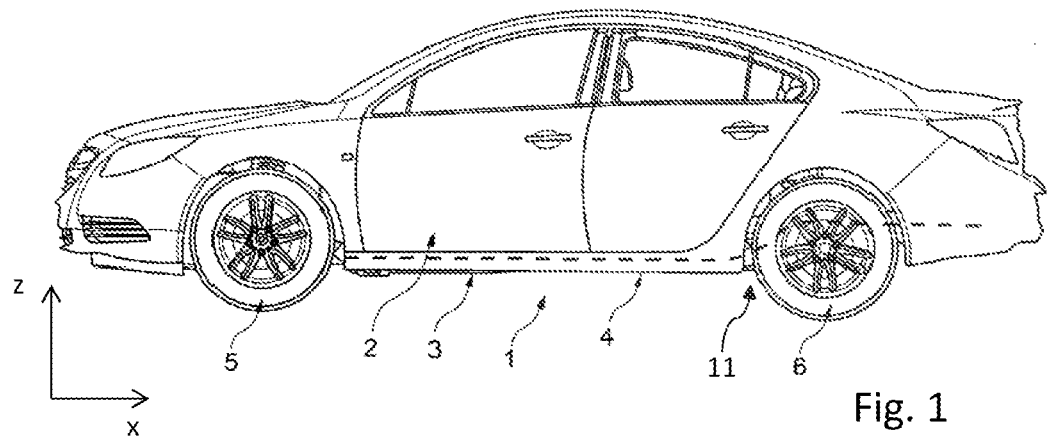
FIG. 1 is a schematic lateral view of a motor vehicle.

The motor vehicle schematically represented in FIG. 1 is a passenger car by way of example. It comprises a body 1 and a passenger cell 2 that with respect to the vehicle longitudinal direction (x) extends between a front wheel 5 and a rear wheel 6. In FIG. 1, a floor structure 3 is represented in interrupted lines, which in the region of the rear wheel 6 merges into a rear frame structure 4.

Figure 2:
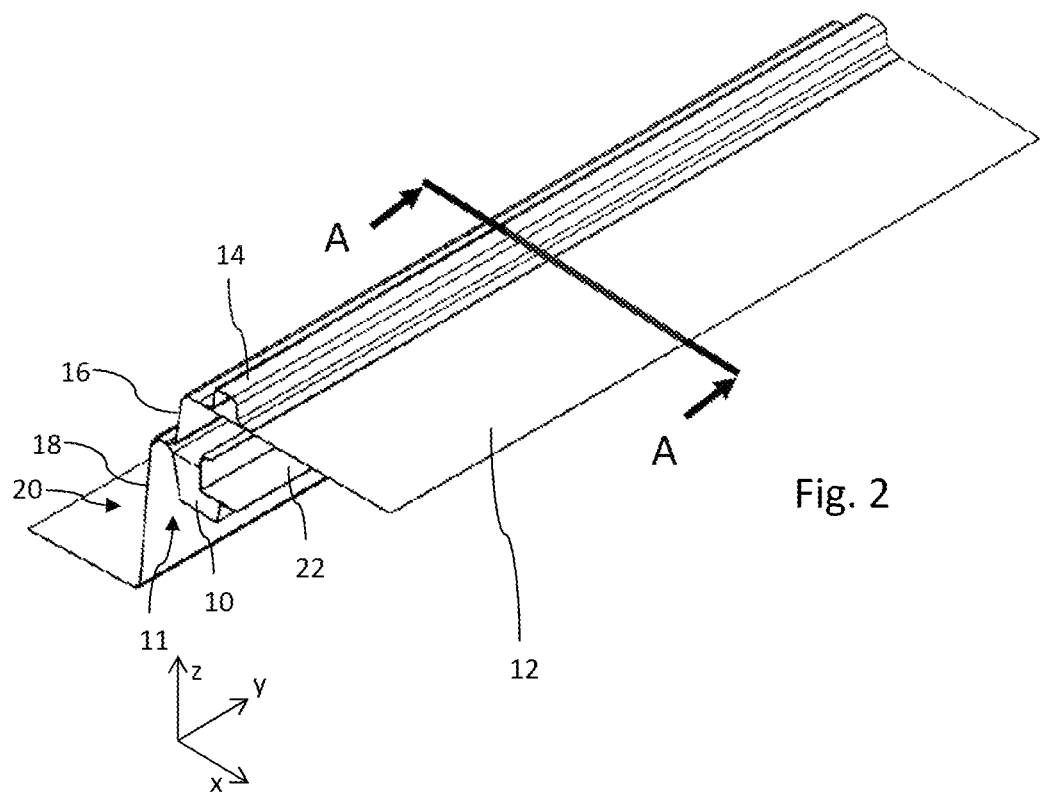
FIG. 2 is an isolated perspective representation of a support structure component provided in the tail region of the motor vehicle and designed as a cross member.
Figure 3:
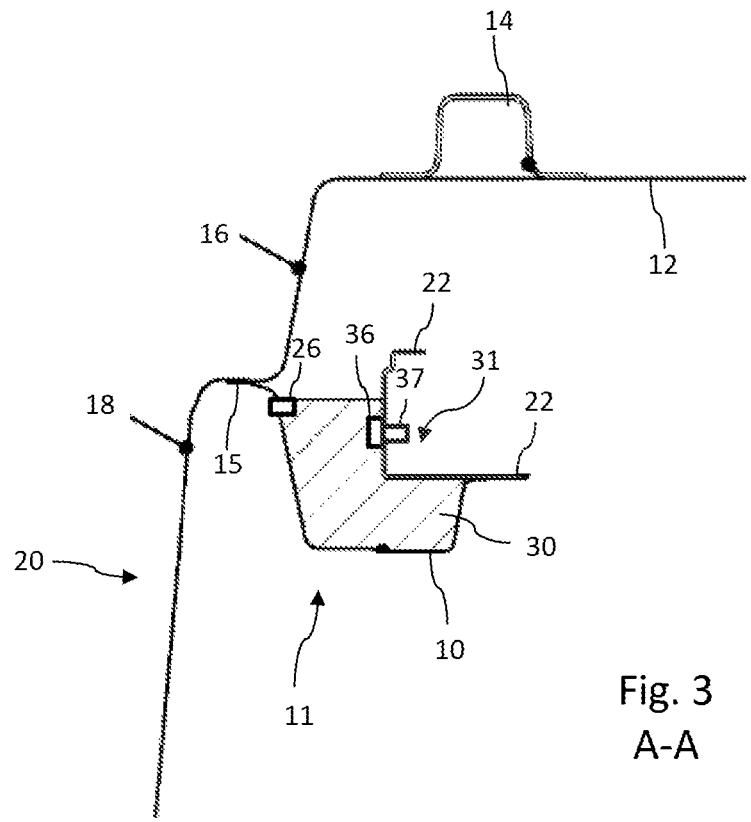
FIG. 3 is a cross section along A-A through the support structure component according to FIG. 2.

In FIG. 2 and FIG. 3, a support structure component 11, which as an example is a cross member is shown in perspective or sectional representation. This support structure component 11 can for example be configured as a rear axle cross member, which structurally interconnects the side members of the floor structure of the motor vehicle body 1 substantially extending in vehicle longitudinal direction (x) in vehicle transverse direction (y).

The support structure component 11, as shown in FIG. 2 and FIG. 3, comprises a support element 10 of sheet metal, into which a plastic fastening structure 30 is inserted. The support element 10 in this case comprises an approximately U-shaped cross-sectional profile which is almost completely filled out by the plastic fastening structure 30. Furthermore, the support structure component 11 in this case is connected to a base portion 16 projecting upwards of a floor panel 12 extending above the support structure components 11, preferably welded. Above the floor panel 12, a U-profile-like or top-hat profile-like reinforcement profile 14 is provided. Towards the front, facing in travelling direction, a profile portion 18 projecting downwards adjoins the base portion 16 and a connecting flange 15 of the support element 10 projecting towards the front, which in the embodiment according to FIG. 2 provides a trough 20, for example for receiving a starter battery.

On the support structure component 11 provided with the plastic fastening structure 30, a further motor vehicle component 22 is fastened. The latter in the configuration according to FIG. 2 and FIG. 3 comprises an approximately C-shaped profile, which at least in regions projects into the cross-sectional contour of the support element 10. According to the geometrical configuration and the provided positioning and connection of the further motor vehicle components 22, the plastic fastening structure 30 is recessed approximately L-shaped.

The L-shaped recess 31 of the plastic fastening structure 30 makes possible an almost full area contact and bracing of the motor vehicle component 22, which in this case can be designed for example as a fastening profile of a pull-out load carrier. For fastening the motor vehicle component 22 to the support structure component 11, at least one fastening element 36 is provided in the region of the plastic fastening structure 30, which can interact with a counter-fastening element 37 of the motor vehicle component 22 for fastening the latter to the support structure component 11.

For example, the plastic fastening structure 30 can be designed as a plastic molding, in particular as a plastic injection molding and comprise individual embedded fastening elements 36 enclosed by the plastic or embedded in and/or projecting there from, such as for example fastening screws or fastening nuts, clips, straps, bands or similar fastening device, with which the motor vehicle component 22 can be fastened to the support structure component 11.

Figure 5A:
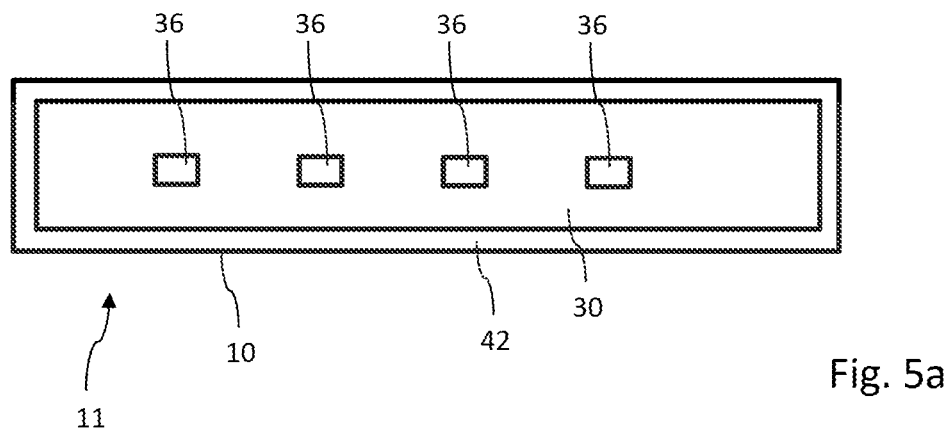
FIG. 5a is a schematic representation of a first plastic fastening structure.
Figure 5B:
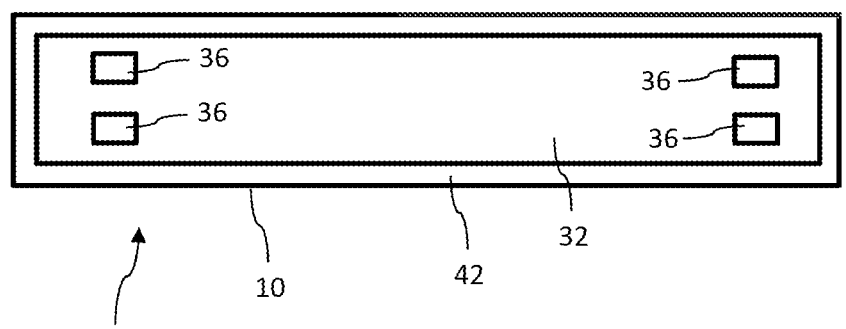
FIG. 5b is a schematic representation of a second plastic fastening structure.
Figure 5C:
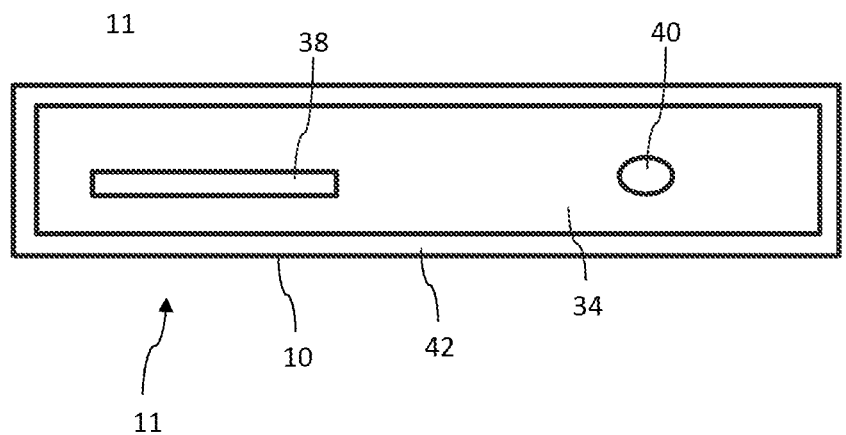
FIG. 5c is a simplified, schematic representation of a further plastic fastening structure.

The plastic fastening structure 30 is preferably connected to the support element 10, in particular glued over the full area, i.e., with almost all outer contours that come into contact with the support element 10. The connection of plastic fastening structure 30 and support element 10 is preferably effected with a thermally activatable adhesive 42, as is schematically indicated in FIG. 5a to FIG. 5c.

With the help of the thermally activatable adhesive 42, a mutual, preferably non-detachable connection of plastic fastening structure 30 and support element 10 can be effected within the course of a drying process following the painting process of the body. During the assembly of the support structure components 11, the respective plastic fastening structure 30 adapted to the provided motor vehicle component 22 has to be selected and fixed to the support element 10 at least for the duration of the production process of the body 1, for example, with the help of fixing elements 26 forming a positive connection.

Figure 4:
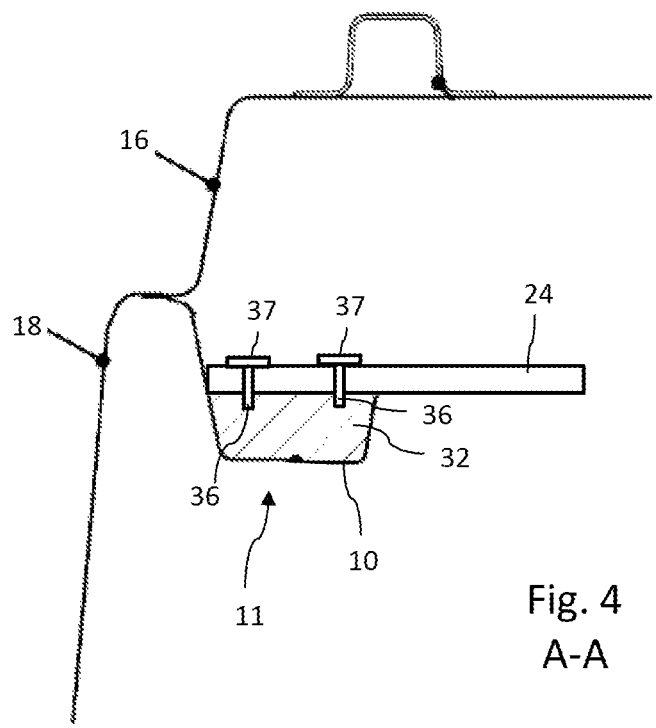
FIG. 4 is a cross section comparable to FIG. 3, however with another motor vehicle component fastened to the support structure component.

The further embodiment according to FIG. 4 shows the connection of another motor vehicle component 24, which is provided for example for fastening a liquefied gas tank below the floor panel 12. Compared with the motor vehicle component 22 shown in FIG. 3, the motor vehicle component 24 has a completely different type of geometrical configuration and requires a corresponding connection to the support structure component 11. Such a configuration-specific body-side connection can be effected in particular by selecting a plastic fastening structure 32 adapted to the motor vehicle component 24 provided here. Similar to the plastic fastening structure 30, this can be inserted into the support element 10 which compared with the embodiment according to FIG. 3 is unchanged.

Compared with the plastic fastening structure 30, the plastic fastening structure 32 provides an entirely different type of fastening structure with different or differently positioned fastening elements 36. With the help of a fastening element 37 for example designed as a screw, the motor vehicle component 24 can be exclusively fastened to the support structure component 11 by way of the plastic fastening structure 32. Adapting the body 1 with respect to its sheet metal components to different vehicle configuration-specific motor vehicle components 22, 24 can be advantageously omitted in this respect. The sheet metal body-in-white structure can always be formed substantially identically and invariable despite a high degree of the diversification of vehicle configurations, so that a corresponding cost and effort savings in the body-in-white construction can be achieved.

The sequence of FIG. 5a, FIG. 5b and FIG. 5c illustrates in simplified and schematic representation different connection concepts, which can be provided with the help of different plastic fastening structures 30, 32, 34 each of which can be inserted in one and the same support element 10 and/or connected therewith. Thus, the plastic fastening structure 30 according to FIG. 5a altogether comprises four fastening elements 36 of the same type, which for example can each be formed as a screw nut embedded in the plastic fastening structure 30.

As a modification thereof, the embodiment according to FIG. 5b shows a further plastic fastening structure 32, in which comparable fastening elements 36 are provided in different positions compared with the embodiment according to FIG. 5a. In FIG. 5c, a variant is finally shown in which different types of fastening elements 38, 40 are provided. For example, the fastening element 38 can provide an elongated hole guide for example in the form of a guide rail embedded in the plastic fastening structure 34, by the fastening element 40 provides a standardized connection, for example for a strap tie or clamping tie for fastening a fuel tank.

In all embodiments of the support structure component 11 according to FIG. 5a to FIG. 5c, one and the same support element 10 of sheet metal can be employed here. A mutual connection of the support element 10 to the likewise fiber-reinforced plastic fastening structure 30, 32, 34 formed as an injection molding can take place by means of a thermally activatable adhesive 42, which advantageously can already be provided in a preassembled manner on the plastic fastening structure 30, 32, 34 in the form of an outer coating.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A carrier in a tail region of a motor vehicle body, comprising:
    a motor vehicle component;
    a support element; and
    at least one plastic fastening structure comprising a plastic material and that is arranged on the support element and that directly contacts the motor vehicle component; and
    the at least one plastic fastening structure comprising:
    at least one plastic fastening element comprising a plastic material and being configured for directly fastening the at least one plastic fastening structure to the motor vehicle component.

2. The carrier according to claim 1, wherein the at least one plastic fastening structure comprises a contact surface at least in sections corresponding to a contour of the support element and configured to contact the support element.

3. The carrier according to claim 1, wherein the at least one plastic fastening structure is connected to the support element in a materially joining manner.

4. The carrier according to claim 1, wherein the at least one plastic fastening structure and the support element are connected with a thermally activatable adhesive.

5. The carrier according to claim 4, wherein the at least one plastic fastening structure on a contact surface facing the support element is coated with the thermally activatable adhesive.

6. The carrier according to claim 1, wherein the at least one plastic fastening structure is fastened to the support element with at least one fixing element forming a positively-joined connection at least in a preassembly position.

7. A support structure component of a motor vehicle body, comprising:
    a support element, wherein the support element is a cross member arranged in a vehicle rear axle region; and
    a first plastic fastening structure is arranged on the support element, the first plastic fastening structure comprising:
    a first fastening element for fastening a motor vehicle component;
    a second plastic fastening structure, wherein the first plastic fastening structure and the second plastic fastening structure are substantially identical with respect to a connection to the support element;
    a second fastening element, wherein the first fastening element and the second fastening element are differently configured and differently positioned.

8. The carrier according to claim 1, wherein the at least one plastic fastening structure corresponds to the motor vehicle component arranged on the support element.

9. A support structure component of a motor vehicle body, comprising:
    a support element;
    a motor vehicle component arranged on the support element; and
    a first plastic fastening structure corresponds to the motor vehicle component and is arranged on the support element, the at least one plastic fastening structure comprising:
    a first fastening element for fastening the motor vehicle component; and
    a second fastening element is substantially matched to the motor vehicle component, wherein the first fastening element and the second fastening element are differently configured and differently positioned; and
    a second plastic fastening structure, wherein the first plastic fastening structure and the second plastic fastening structure are substantially identical with respect to a connection to the support element.

10. The carrier according to claim 1, wherein the motor vehicle component is a load carrier.

11. The carrier according to claim 1, further comprising at least two plastic fastening structures which with respect to a connection to the support element are substantially identical, which have differently configured differently oriented fastening elements.

12. The carrier according to claim 1, wherein the motor vehicle component is a pull-out load box.

13. The carrier according to claim 1, wherein the motor vehicle component is an electric energy storage unit.

14. The carrier according to claim 1, wherein the motor vehicle component is a fuel tank for a liquid fuel.

15. The carrier according to claim 1, wherein the motor vehicle component is a fuel tank for a gaseous fuel.

16. A carrier in a tail region of a motor vehicle body, comprising:
    an electric energy storage unit;
    a support element; and
    at least one plastic fastening structure is arranged on the support element and directly contacts the electric energy storage unit, the at least one plastic fastening structure comprising at least one plastic fastening element comprising a plastic material and being configured for directly fastening the at least one plastic fastening structure to the electric energy storage unit.

17. The carrier according to claim 1, wherein the at least one plastic fastening structure forms an insert that is insertable into the support element.

18. The support structure component according to claim 1, wherein the motor vehicle component is a fuel tank for a liquid fuel.

\* \* \* \* \*